Feb. 1, 1966  K. H. ANDREN ETAL  3,231,961
WIRE CUTTING AND TERMINAL ATTACHING MACHINE
Filed Oct. 29, 1963  8 Sheets-Sheet 1

INVENTORS
KARL H. ANDREN
MAGNUS RANDAR
SVEN O. SANDBLOM

Lieben & Niller
ATTORNEYS

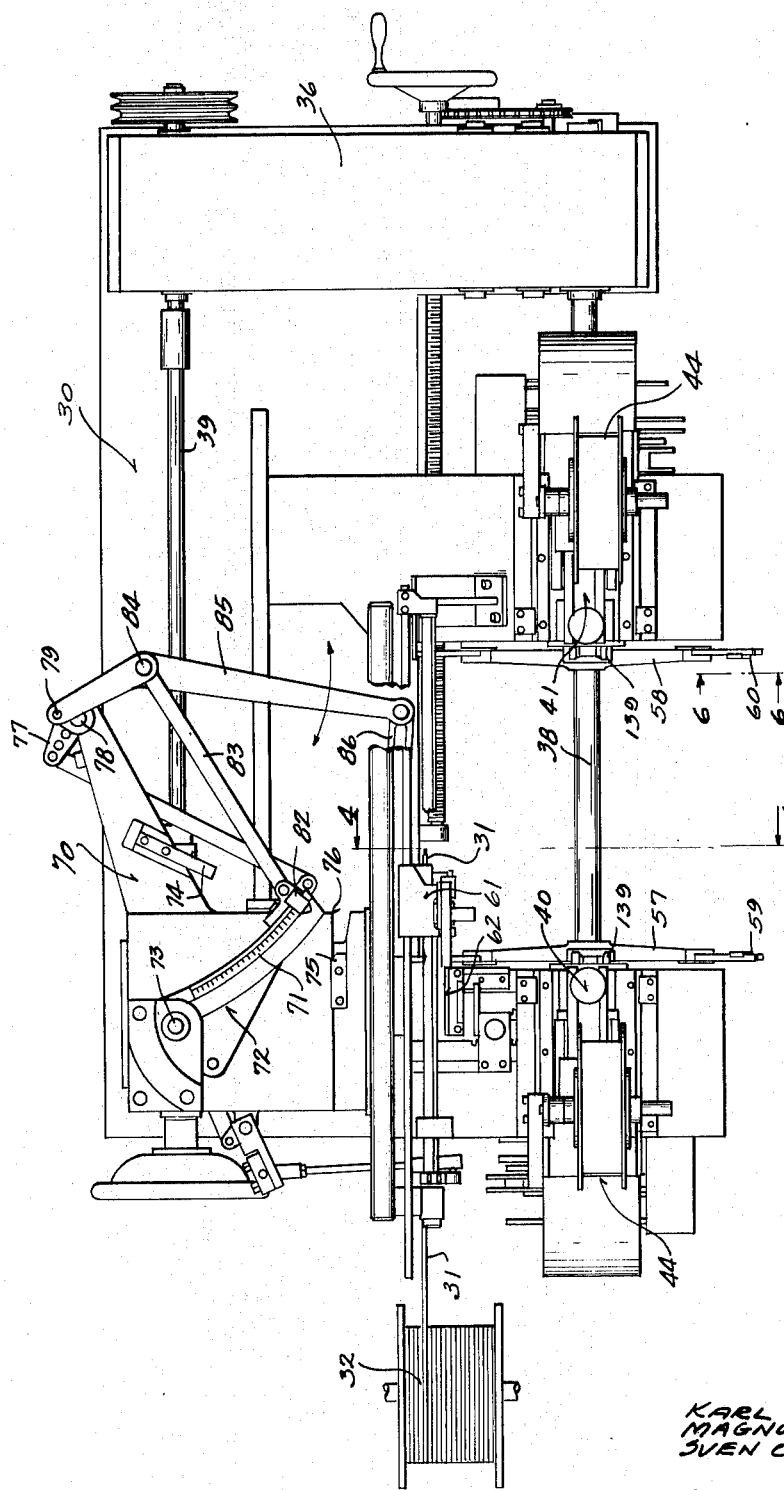

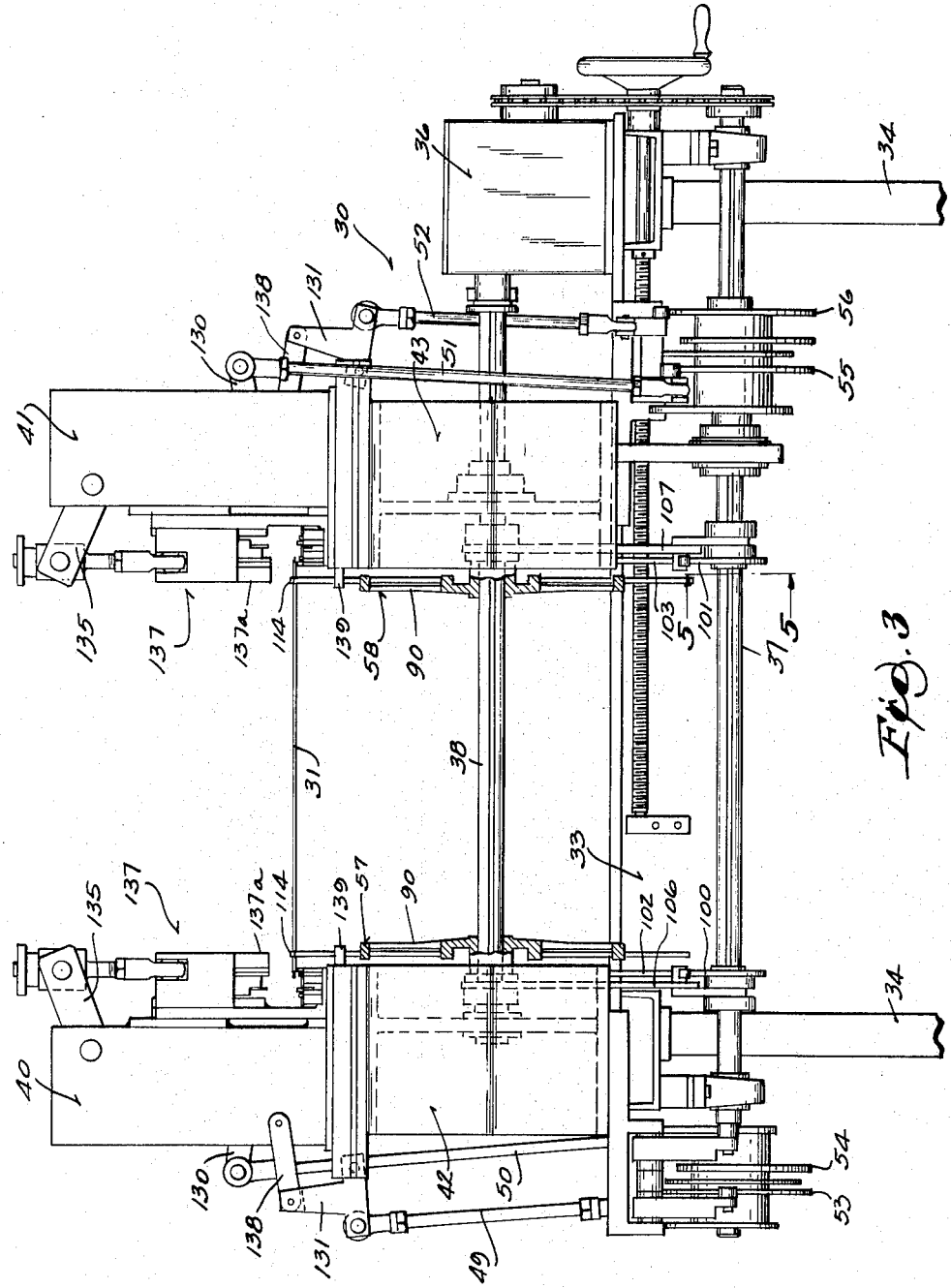

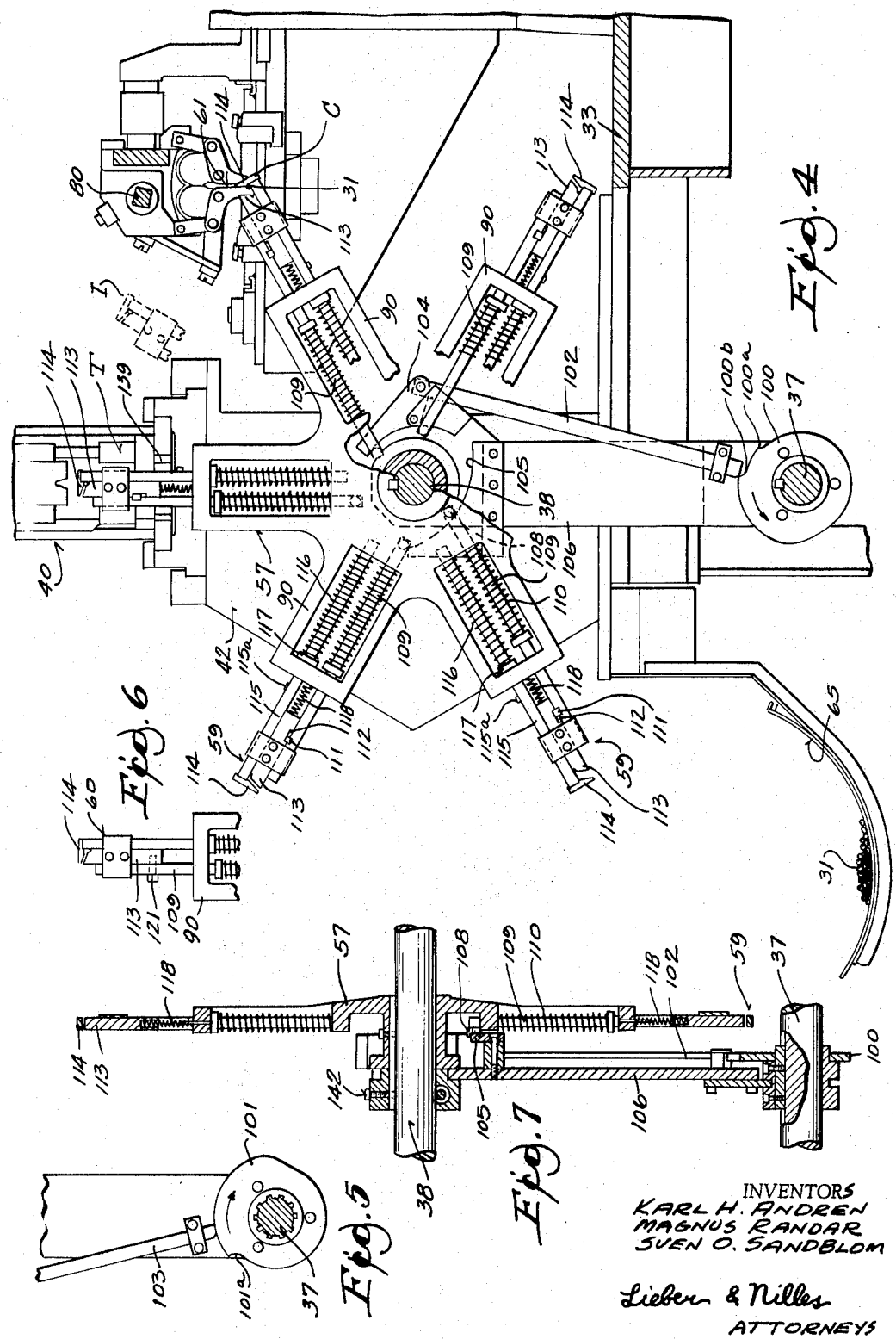

Feb. 1, 1966   K. H. ANDREN ETAL   3,231,961
WIRE CUTTING AND TERMINAL ATTACHING MACHINE
Filed Oct. 29, 1963   8 Sheets-Sheet 5

INVENTORS
KARL H. ANDREN
MAGNUS RANDAR
SVEN O. SANDBLOM
Lieber & Nilles
ATTORNEYS

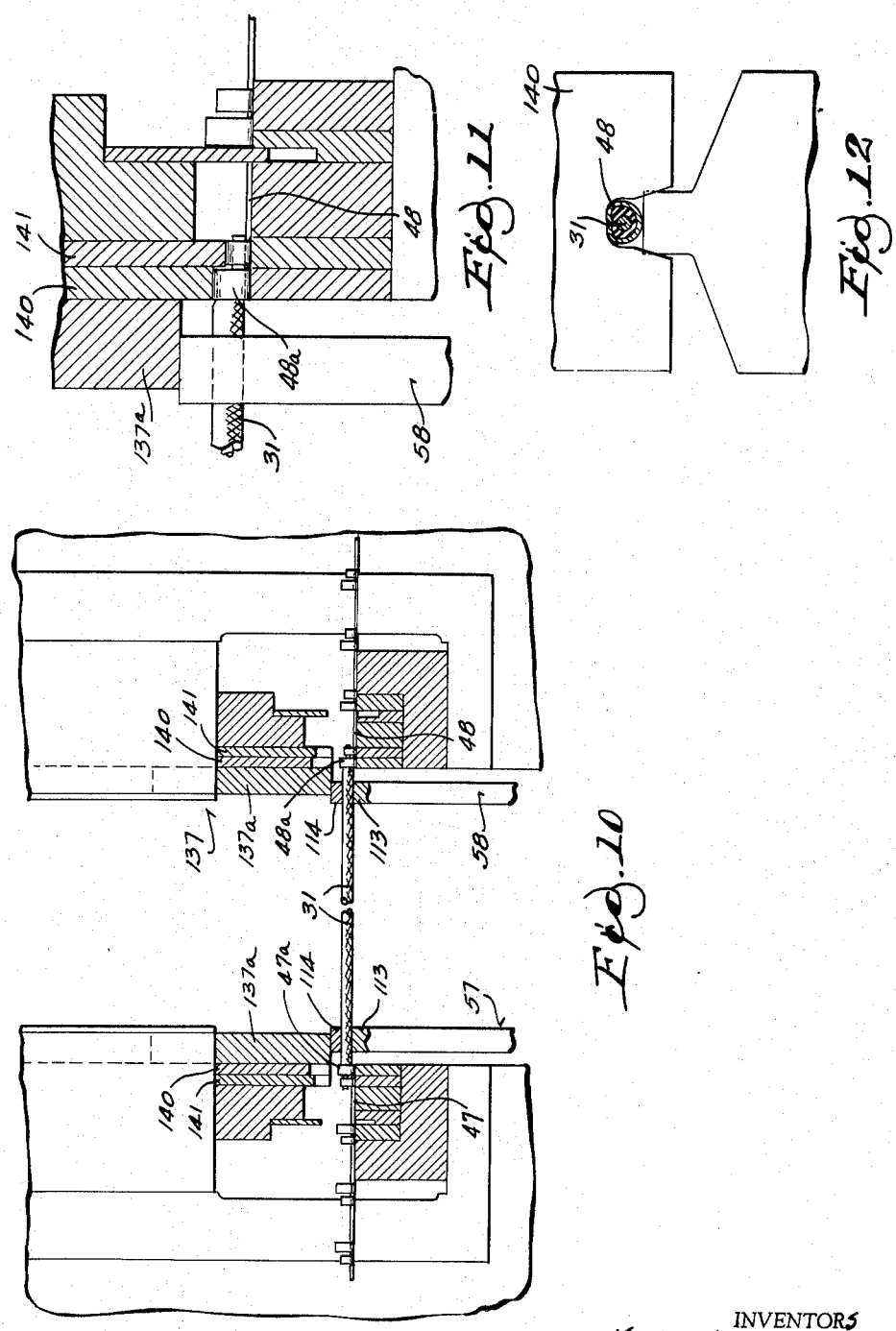

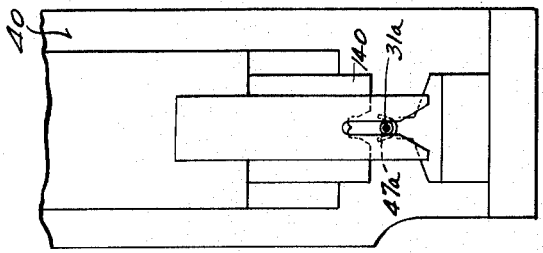
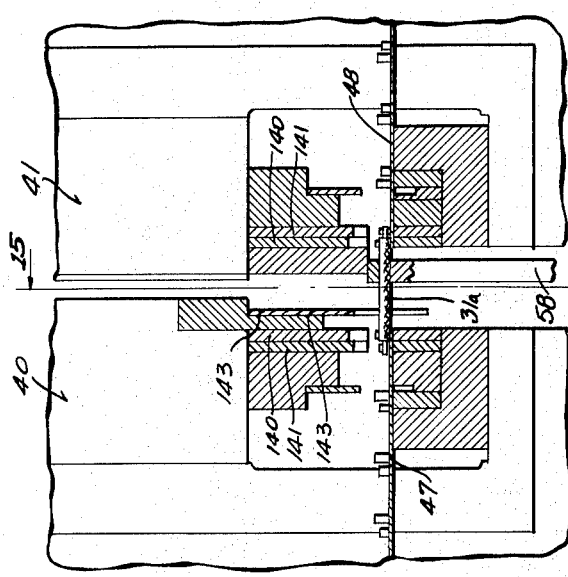
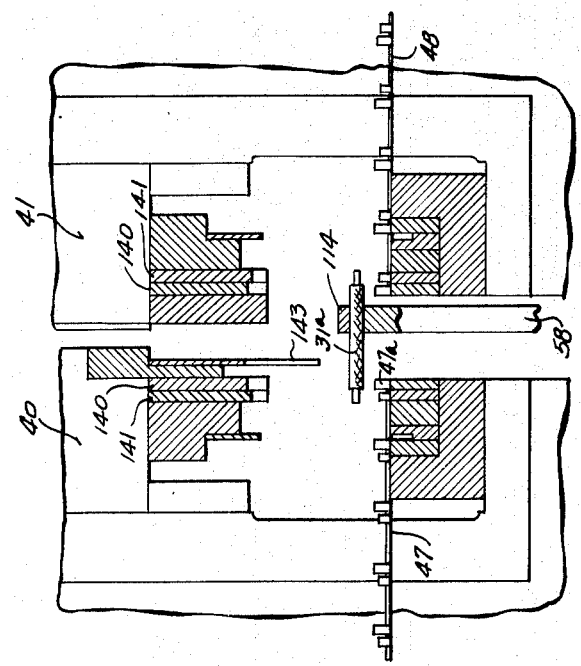
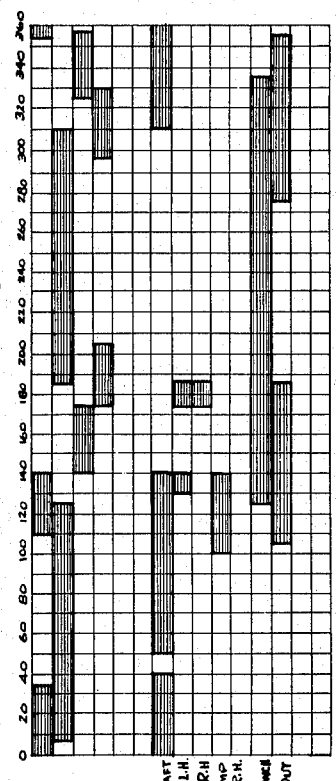

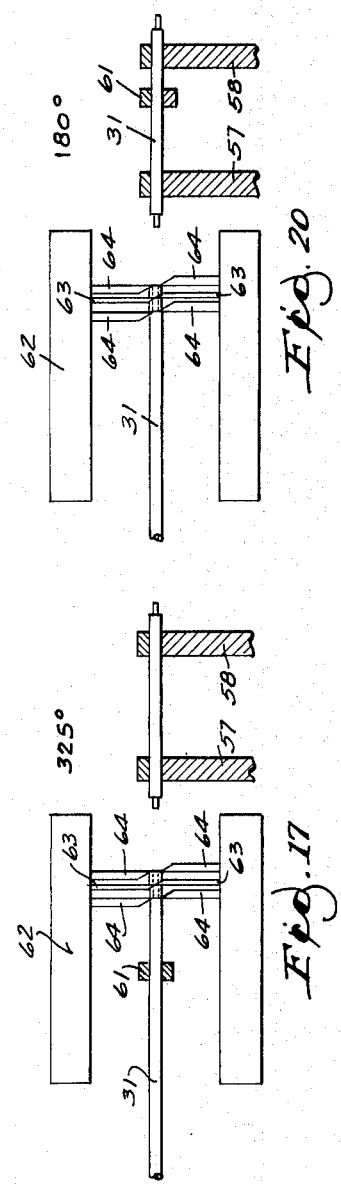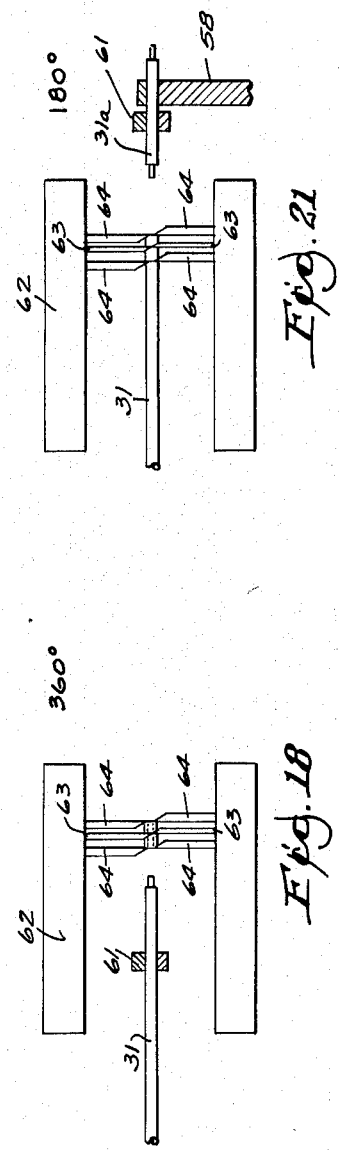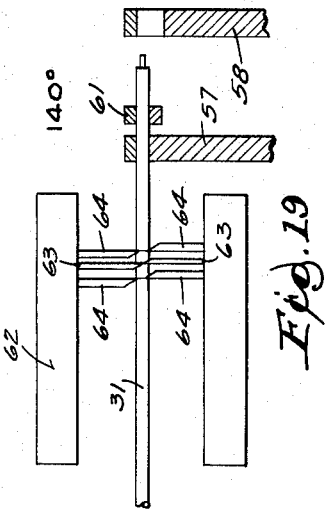

United States Patent Office 3,231,961
Patented Feb. 1, 1966

3,231,961
WIRE CUTTING AND TERMINAL ATTACHING MACHINE
Karl H. Andren, West Allis, Magnus Randar, Milwaukee, and Sven Olaf Sandblom, Greenfield, Wis., assignors to Artos Engineering Company, Milwaukee, Wis., a corporation of Wisconsin
Filed Oct. 29, 1963, Ser. No. 319,762
15 Claims. (Cl. 29—33)

This invention relates to improvements in the art of producing electrical conductors from wire stock, and relates more particularly to improvements in the construction and operation of machines for cutting insulated wire stock into predetermined lengths and for stripping insulation from the severed wire stock, and to mechanism cooperable with the cutting and stripping device for successively advancing the severed wire stock to a terminal applying device.

The primary object of the present invention is to provide a machine for initially, rapidly, and automatically producing successive electrical conductors of any desired length from longitudinally advancing wire stock, thereafter effectively holding the successive conductors for cutting and stripping, subsequently advancing and holding the conductors for terminal application, and finally, depositing the same in a discharge zone.

Prior art machines such as disclosed in U.S. Patent No. 1,874,216 provide a means wherein successive wire lengths are severed in one zone and wherein the severed lengths are conveyed laterally with the aid of revolving conveyors to a second zone, and thereafter stripping the insulation from the ends of each length in the second zone. Also, German Patent No. 565,605 discloses apparatus for severing successive lengths of wire from a continuous supply in one zone, after which the severed lengths are conveyed laterally to a second zone by means of rotary conveyors for the application of terminals to the severed wire ends. However, such prior apparatus was cumbersome and ineffective insofar as the terminal applying mechanism was concerned.

Another prior art machine is disclosed in U.S. Patent No. 2,908,910 wherein terminals are applied to only one end of successive lengths of wire stock. While these machines were effective in applying the terminals, the use thereof was limited undesirably to instances wherein terminals were required on only one end of the successive conductors.

The present invention contemplates provision of apparatus wherein both short and long electrical conductors may be formed with terminals applied thereto at both ends, and wherein improved structure is provided for handling the wire stock during the application of terminals thereto.

In the preferred embodiment, the rotating member for arcuately advancing the wire stock is a spider member having a plurality of radially extending arms having wire gripping means at the ends thereof for gripping the wire stock with a plurality of wire holding forces depending upon the machine phase of operation.

It is sometimes desirable to apply terminals to extremely short lengths of wire stock, namely, to lengths of three inches to one and one-half inches. Thus, provision is made for using a single spider member for gripping the severed wire to carry it from the severing zone to the terminal application zone, thereby allowing for terminal attachment at the ends of a small length of wire stock.

Also, it is another object of this invention to provide a wire cutting, stripping, and terminal attaching unit wherein a rotatable member is automatically advanced to cooperate with the terminal attaching mechanism.

Another object of the invention is to provide an improved mechanism for the application, alignment, and gripping of severed lengths of wire stock relative to a terminal attaching device.

A further object of the invention is to provide a rotatable member for handling wire stock wherein the wire is initially gripped lightly for positioning purposes during the wire stripping operation and then more heavily for advancement to the terminal attachment zone, whereby clean and accurate stripping is accomplished without losing the wire during the operation.

Another object of the invention is to provide an improved wire stock handling means wherein wire stock handling and gripping action are sequentially varied in accordance with the machine operation of producing cut and stripped conductors having terminals applied thereto.

It is another object of the invention to provide an improved mechanical sequencing means for sequentially cutting, stripping, and applying terminals to successive lengths of wire stock.

These and other more specific objects and advantages of the invention will be apparent from the following detailed description.

A clear conception of the several improved features constituting the present invention, and of a typical commercial machine for producing electrical conductors in accordance therewith, may be had by referring to the drawings accompanying and forming a part of this specification, wherein like reference characters designate the same or similar parts in the various views:

FIGURE 2 is a plan view of the machine of FIGURE 1;

FIGURE 3 is a partial elevational view of the machine of FIGURE 1;

FIGURE 4 is the side elevational view in partial section taken along line 4—4 of FIGURE 2;

FIGURE 5 is a section taken along line 5—5 of FIGURE 3 and showing the right-hand spider actuating cam;

FIGURE 6 is an enlarged view taken along line 6—6 of FIGURE 2;

FIGURE 7 is an elevational view in partial section of the left-hand spider member of FIGURE 3;

FIGURE 10 is a section through only the terminal attaching dies as taken along line 10—10 of FIGURE 2;

FIGURE 11 is an enlarged partial elevation of the terminal applicator or attaching dies showing the same in clinched position;

FIGURE 12 is an end view of FIGURE 11;

FIGURE 13 is an elevation in partial section of the terminal attachment to a short wire;

FIGURE 14 is a similar view in partial section of the terminal attachment to a short wire, but showing the subsequent sequence;

FIGURE 15 is a section taken along line 15—15 of FIGURE 14;

FIGURE 16 is a schematic sequence diagram of the machine operation;

FIGURE 17 is an elevation schematically showing the cutting blade in relation to the wire stock at 325°;

FIGURE 18 is an elevation schematically showing the cutting blade in relation to the wire stock at 360°;

FIGURE 19 is an elevation schematically showing the cutting blade in relation to the wire stock at 140°;

FIGURE 20 is an elevation schematically showing the cutting blade in relation to the wire stock at 180°; and FIGURE 21 is an elevation schematically showing the cutting blade in relation to the wire stock at 180° with a single spider element for short wires.

Figure 1:
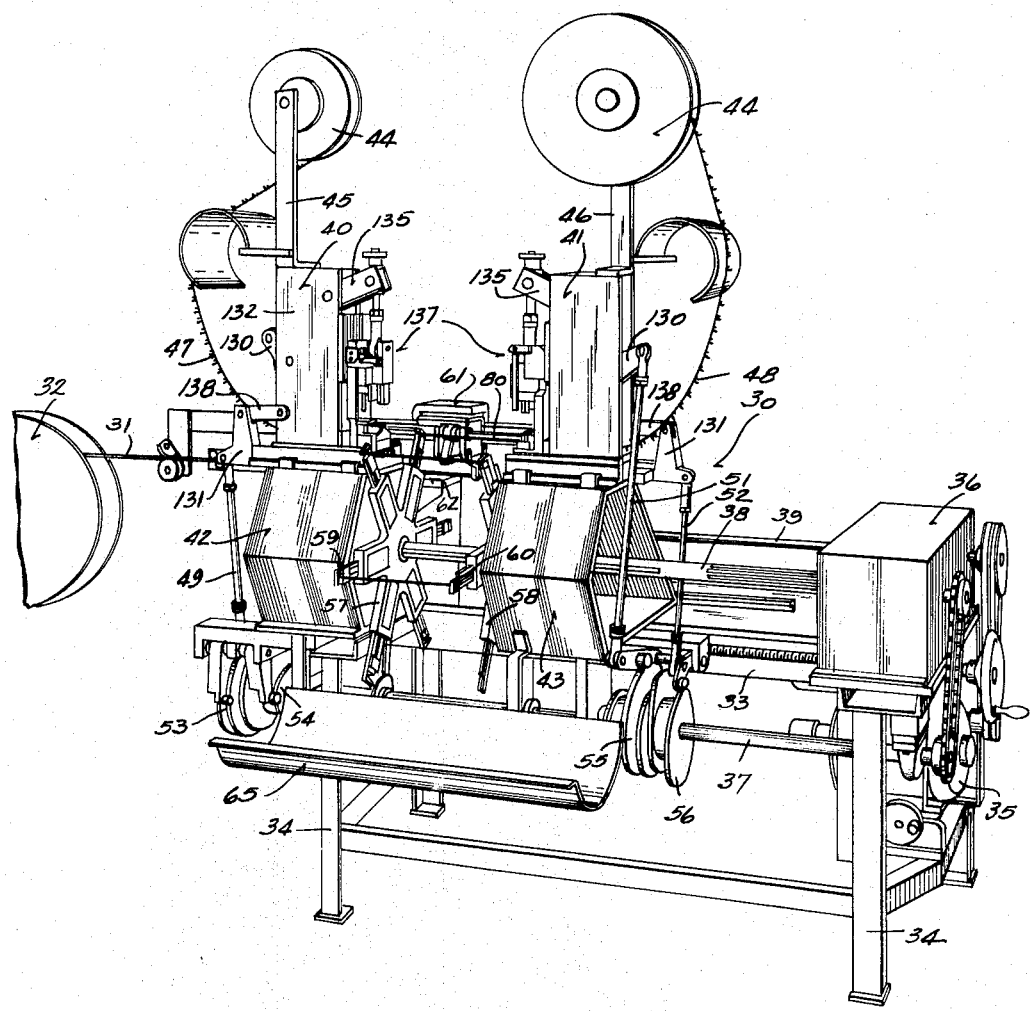
FIGURE 1 is a perspective view of a complete machine for producing successive conductors of desired lengths from longitudinally advancing insulation-covered wire stock.
Figure 8:
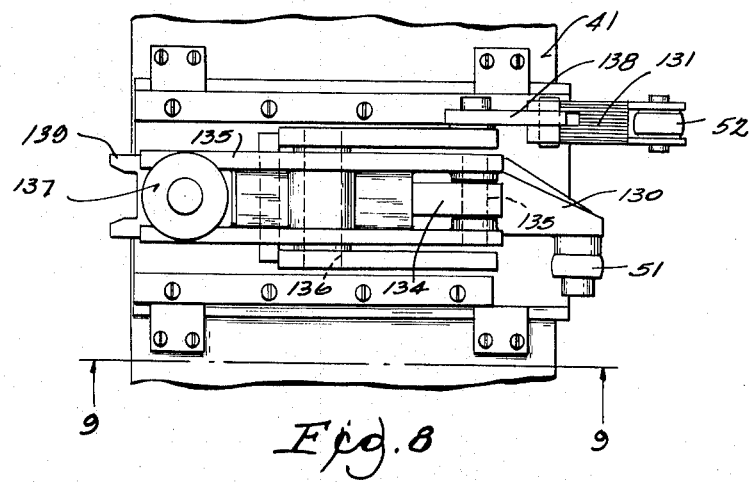
FIGURE 8 is an enlarged plan view of the terminal attaching device.
Figure 9:
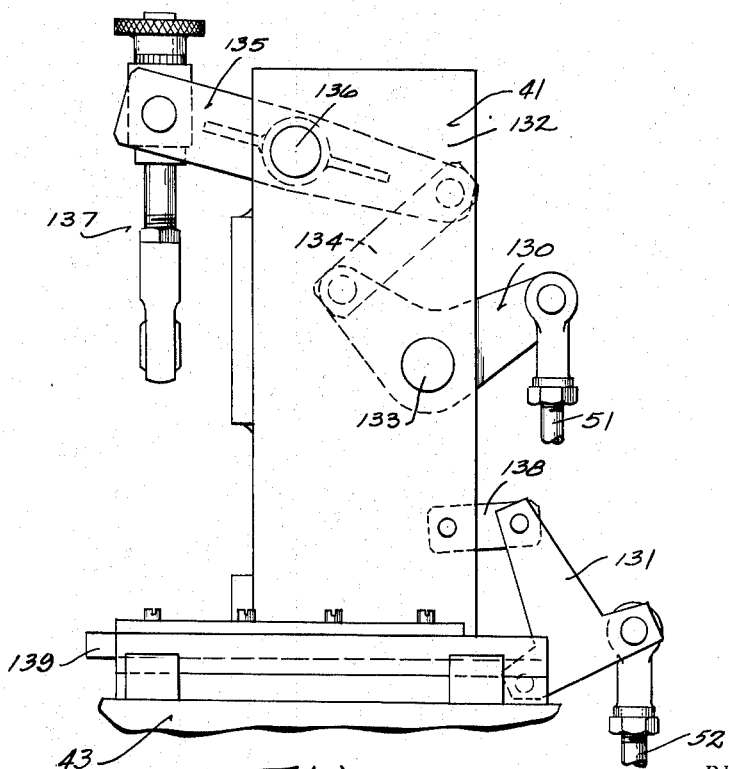
FIGURE 9 is an enlarged elevational view of a terminal attaching device taken along line 9—9 of FIGURE 8.

Referring now to the drawings wherein a wire cutting, stripping, and terminal attaching machine 30 for producing electric conductors of various lengths is shown. In general, insulated wire stock 31 is fed to the machine 30 from a wire supply reel 32 where the wire stock is cut to a desired length, insulation is stripped from the ends of the cut wire stock, and the cut and stripped wire stock is carried or advanced in a predetermined sequence to a terminal attaching zone where terminals are applied to one or both ends of the cut and stripped wire stock. The construction of the machine 30, to be described in detail hereinafter, is such that work operations performed on the wire stock are accomplished in a predetermined sequence as wire stock is fed to the machine. The completed electric conductors formed from the wire stock are discharged from the machine in condition for use in electric panel boards, wiring circuits, and the like.

The machine 30 is also constructed to provide electric conductors of various lengths ranging, for example, from one and one-half to twenty inches more or less, special provision being made for fabricating electric conductors of extremely short length. In the embodiment shown, the short length conductor is less than three inches in length, and provision is made for applying terminals to both ends of such short electric conductors.

In FIGURE 1, the machine 30 is shown as having a main frame 33 supported on legs 34. Power for the machine 30 is supplied by motor 35 driving through gear reduction unit 36, and, in particular, shafts 37, 38, and 39 are driven thereby to directly or indirectly effect the sequential operation of the machine 30, as described hereinafter. A pair of terminal attaching devices 40, 41 are shown mounted on auxiliary frames 42, 43. Each terminal attaching device is provided with a terminal supply reel 44 rotatably carried on reel support members 45, 46 to supply terminals 47, 48 to terminal attaching devices 40, 41. The terminal attaching devices are sequentially actuated by means of connecting rods 49, 50, 51, 52 moved by conjugate cams 53, 54, 55, 56 as shaft 37 is rotated as is described in greater detail hereinafter.

The auxiliary frames 42, 43 also support shaft 38 on which are mounted wire conductor carrying members 57, 58. The members 57, 58 are keyed to shaft 38 and rotate therewith to arcuately advance a wire conductor gripped in the wire gripping units 59, 60 of members 57, 58, respectively.

It should be noted that auxiliary frame 43 carrying terminal attaching device 41 and a bearing support for shaft 38 is adjustable longitudinally on the main frame 33 and shaft 38 to position members 57 and 58 at various distances apart for the handling of wire conductors of varying lengths. Further, when extremely short conductors are desired, provision is made for the simple removal of wire conductor carrying member 57, as is described in detail hereinafter, so that the member 58 will arcuately advance short lengths of cut wire stock for the formation of electric conductors having terminals applied thereto.

Provision is also made for feeding and severing the wire stock 31 as it is fed to the machine 30 from supply reel 32. A reciprocating wire stock feeding clamp 61 advances the wire stock to a wire cutting and stripping unit 62 having a set of motor-driven wire and insulating cutting knives 63, 64, substantially as described in detail in U.S. Patent No. 2,908,910. The sequencing of the wire feed, cutting, and stripping is in predetermined relation to the rotation of members 57, 58 as the wire stock is cut and arcuately advanced to the terminal attaching devices 40, 41, and thence to discharge trough 65.

To determine the length of wire stock to be cut, a gauging unit 70 (see FIGURE 2) is provided as described in U.S. Patent No. 2,908,910. The gauging unit 70 coacts with the overall operation of machine 30 to produce the length of electric conductors as determined by a predetermined setting on gauge unit 70.

Thus, a general description of the various components of machine 30 has been given to assist in understanding the overall operation of the machine 30 as it cuts, strips, and applies terminals to various lengths of wire stock. While the improvements have been illustrated and described as being especially, advantageously embodied in a wire cutting, stripping, and terminal applying machine, it is not intended to thereby unnecessarily limit or restrict the invention. It is also contemplated that certain descriptive terminology used herein shall be given the broadest possible interpretation consistent with the disclosure.

Reference is now made to FIGURES 1, 2, and 3 for a detailed description of machine 30, wherein the wire feed clamp 61 grips the wire stock in a manner described in Patent No. 2,908,910 and then moves through the cutting and stripping unit 62, the jaws of clamp 61 being operable by oscillation of rod 80 in a well-known manner.

The measurement of the amount of wire stock to be fed is determined by gauge unit 70. A gauge 71 is mounted upon an arcuate lever 72 which is oscillatable by a shaft 73. The lever 72 is periodically swingable between fixed stops 74 and 75 mounted upon an auxiliary frame 76 and driven from shaft 39.

An oscillatory bell crank 77 pivoted on a shaft 78 carries a pin 79 and is swingable about the pivot shaft 78 from within the auxiliary frame 76 through a link 81 to impart intermittent oscillatory motion to the bell crank 77 to thereby vary the position of the pin 79. A block 82 which is slidably adjustable along the arcuate lever 72 is connected by a link 83 to a pin 84 mounted upon a medial portion of a lever 85, one end of which is fulcrumed on the oscillatory pin 79, and the opposite end of which is attached to the wire feeding clamp 61 by a link 86. The block 82 is adjustable along the lever 72 to vary the stroke of the feed clamp 61 as produced by this calibrated lever, from its maximum as illustrated in the setting of FIGURE 2 to lesser strokes as the block 82 is adjusted toward the shaft 73.

The oscillatory motion of the pin 79 carried by the bell crank 77 slightly shifts the fulcrumed point of the lever 85 whenever a length of wire stock 31 has been advanced, thereby causing the lever 85 which is then pivoting about the pin 84 to give an additional right movement to the clamp 61 in a direction toward the device 43, thereby stripping the insulation from the trailing end of the wire 31.

Whenever the feeding clamp 62 reaches the outer end of its stroke toward the device 43 as determined by the adjustment of the gauge block 82 along the lever 72, there is a slight dwell in the reciprocating motion of the clamp which permits the square shaft 80 to be rotated to actuate the jaws of clamp 61, thereby opening and raising the clamp fingers. When the clamp 61 returns to the left above the cutting zone, there is again a dwell, and the square shaft 80 then actuates the clamp to close the fingers and grip the wire 31 whereupon the pin 79 will again actuate lever 85 to move the clamp 61 in a direction away from the cutting zone and toward the wire straightener. Thereupon, the lever 72 will again cause the clamp 61 to advance the wire 31, commencing a new sequence of operation.

The severed sections of wire stock are then successively received by wire conductor carrying members 57, 58 which are in an initial indexing position (see FIGURE 4) to receive the wire held in clamp 61. The members 57, 58 are rotated or indexed by the rotation of shaft 38. In the preferred embodiment, the members 57, 58 are shown as having a plurality of arms 90 radially extending from the centerline of shaft 38. At the outer end of each arm 90 are wire gripping units 59, 60 of members 57, 58, respectively. The units 59, 60 differ as will hereinafter be described (see FIGURES 4 and 6).

The wire gripping units 59, 60 are actuated sequentially by the combined rotation of shafts 37 and 38. Cams 100 and 101 are mounted to rotate with shaft 37 to position links 102 and 103, respectively, for pivoting cam segment 104. It should be noted that cam 100 is provided with two cam steps 100a, 100b, whereas cam 101 has a single step 101a. The two cam steps 100a, 100b relate to two-stage clamping by the wire gripping units 59 to be described in greater detail hereinafter.

In addition, cam segments 105 are mounted on support members 106, 107 for engagement with clamping rod rollers 108 carried by wire clamping rods 109. The rods 109 are carried by arms 90 for reciprocable movement relative thereto. Springs 110 are provided for each rod 109 to urge the rod radially outward from shaft 38. The rods 109 constitute the actuating rods to determine the wire gripping of units 59, 60. For example, as member 57 is rotated by shaft 38, a rod roller 108 follows cam segment 105 in such a manner that the rod 109 is positioned toward shaft 38 against the urging of spring 110. As rod 109 is thus positioned, a block 111 is moved in slot 112 until it strikes the end thereof at wire clamping jaw 113 to move the jaw 113 away from wire clamping jaw 114 which is mounted on the end of rod 115. Rod 115 is also carried by arm 90 and is urged radially outwardly by a spring 116 until stopped by rod collar 117. The rod 115 ordinarily remains in an outwardly directed position until it is acted upon during the terminal applying operation (to be described hereinafter).

Springs 118 are additionally provided in member 57 for urging jaws 113 outwardly from arms 90 to assist in providing a two-stage gripping action at jaws 113, 114.

As the wire feed clamp 61 finishes its feeding stroke adjacent member 58, it will be indexed to receive the wire in open jaws 113, 114. At this point, the cam 100 will be rotated until rod 102 drops down step 100a to allow cam segment 104 to swivel about pin 120 to allow rod 109 to move outwardly of shaft 38. The amount of movement of rod 109 allows jaw 113 to clamp the wire 31 lightly by means of a light compression spring 118 as the block 111 in slot 112 prevents the action of a heavier compression spring 110 on the jaws 113. With the jaws 113, 114 thus holding the wire lightly, the stripping stroke of the feed clamp 61 occurs. As the wire 31 slides between the closed jaws during the stripping stroke, it will be held taut and in position, but with light pressure of the jaws acting on the wire as occasioned by spring 118, no "milking" of wire insulation over the stripped portion of the wire will occur.

When the stripping stroke has been completed, the rod 102 will drop down cam step 100b to pivot cam segment 104 an additional amount. Rod 109 is thus allowed to move outwardly from shaft 38 an additional amount causing block 111 to contact the outward surface of slot 112 to add the force of spring 110 to the jaws 113, 114 and thereby more tightly clamp the same against the wire 31.

Thus, the wire gripping action of member 57 is a two-stage action as the member 57 carries the trailing end of wire stock 31 after severance. However, the member 58 carrying the leading end of the wire stock in wire clamping units 60 does not require this two-stage clamping action, and the spring 118 is therefore eliminated and rod 109 is secured to wire jaw 113 as by fastener 121, the wire feed clamp 61 thereby holding the leading end of the wire stock 31 securely until after the stripping stroke. Cam 101 is therefore provided with only one cam step 101a so that as rod 103 drops down step 101a, the full pressure of the spring 110 acts upon and causes jaws 113, 114 to grip the wire securely after the completion of the stripping of the trailing end of the wire.

The severed wire stock 31 gripped by wire gripping units 59, 60 of rotatable members 57, 58 is indexed by shaft 38 to carry or advance the wire stock to the terminal attaching devices 40 and 41, which are disclosed in detail in FIGURES 2, 8, 9, and 10. The actuation of terminal attaching devices 40, 41 is determined by the coaction of conjugate cams 53, 54, 55, 56 and connecting rods 49, 50, 51, 52, respectively. The conjugate cams are rotated by the rotatable shaft 37 in sequential relation to the rotation of cams 100, 101 mounted on the same shaft as hereinabove described.

As the conjugate cams are rotated, the connecting rods 49, 50, 51, 52 are positioned to actuate terminal attaching devices 40, 41. For example, the rotation of conjugate cams 55, 56 positions connecting rods 51, 52. Rod 51 is connected to bell crank 130, and rod 52 is connected to pivot arm 131. The bell crank 130 is pivotally mounted on terminal housing 132 as by a pin 133, and as the bell crank is positioned by rod 51, connecting link 134 pivots member 135 about pin 136 to open and close the terminal applicator 137.

Rod 52, positioned by conjugate cam 56, is connected to arm 131 which is pivotally attached to housing 132 by a link 138. Thus, as the cam 56 is rotated, it causes the displacement of connecting rod 52 to thereby move the terminal applicator toward or away from the wire to which a terminal is to be applied. In turn, a U-shaped member 139 may, if desired, be attached to the terminal applicator for movement therewith. Accordingly, as the terminal applicator is moved toward the wire, the U-shaped member will engage wire gripping unit 59 of member 57 as the member 57 is indexed into alignment with terminal attaching device 41 (see FIGURE 4). Thus, the member 139 positively locates a wire gripping unit 59 carrying a wire 31 in relation to the terminal attaching device 41 for attachment of a terminal 47 to a stripped end of wire 31.

Referring now to FIGURE 10, the wire 31 is carried to terminal attaching devices 40, 41 where the wire is located directly over terminals 47 and 48. The action of conjugate cams 54, 55 causes terminal applicator 137 to move downwardly as hereinabove described to engage jaw 114 on rod 115 of wire gripping unit 59. As tool 137 engages jaw 114 carrying wire 31, continued downward positioning of tool 137 and the punch rod 137a thereof by the action of connecting rod 51 causes rod 114 and collar 117 to move toward shaft 38 to compress spring 116. This action of tool 137 lowers wire 31 without distortion thereof into terminal applying position within ears 47a, 48a of terminals 47, 48, whereupon further movement of the rod 115 is arrested by a stop pin 115a. As the downward stroke of tool 137 continues, punch rod 137a retracts into applicator 137 against the compression of a spring (not shown), and crimping die members 140, 141 (see FIGURE 11) will crimp the terminal ears 47a, 48a over the ends of wire 31.

Thus, the members 57, 58 are indexed by shaft 38 to carry and advance wire 31 from a position wherein the wire is received from wire feed clamp 61 to a position directly over the terminals to be applied at the terminal attaching devices 40, 41. The wire to which terminals are to be applied is accordingly lowered into the terminals, as hereinabove described, without any bending or other distortion of the wire prior to the crimping action of die members 140, 141.

As mentioned hereinabove, the machine 30 is also adaptable to apply terminals to short lengths of wire. This is accomplished by removing rotating member 57 from shaft 38 as by loosening a clamp lock 142 of member 57 as shown in FIGURE 7, and the shaft 38 can be slidably positioned to the right, as viewed in the drawings, until member 57 can be taken off at the end of shaft 38 and removed from the machine 30. The shaft 38 is then slidably returned to its initial position in machine 30, and the auxiliary frame 43 and rotating member 58 are positioned toward auxiliary frame 42 so that wire gripping unit 60 of member 58 is in a position to receive and grip the short wire 31a (see FIGURE 13).

In addition, the push-down punch 137a of terminal attaching device 40 is removed, and a wire guide 143 is installed. The wire guide 143 (FIGURE 13) serves to guide the end of wire 31a protruding from wire gripping unit 60 of member 58 into the open ears 47a of terminal 47.

Thus, for applying terminals to short lengths of wire 31a, the rotating member 58 indexes to carry the wire 31a to the terminal attaching devices 40, 41 wherein the wire guide 143 has been placed in device 40. As the connecting rods 49, 50, 51, 52 are actuated by conjugate cams 53, 54, 55, 56, as hereinabove described, terminal attaching devices 40, 41 are caused to apply terminals 47, 48 to the short wire length in timed relation to the wire feed and rotary member indexing.

The sequence of the operation of machine 30, in reference to the timing diagram of FIGURE 16, and beginning at 0° thereof, is as follows:

The wire feed clamp 61 is gripping the wire stock 31 which has the leading end severed and stripped, at the left-hand side of the cutting unit 62 as viewed in the drawings. The feed clamp 61 is positioned longitudinally toward the members 57, 58, and the cutting unit 62 opens to allow clamp 61 to pass therethrough, as described in U.S. Patent No. 2,908,910. The rotating members 57, 58, having wire gripping units 59, 60 which are to transfer the severed wire stock 31 from the cutting zone "C" to the terminal attaching zone "T," are already being indexed by shaft 38 into an index position to receive the wire 31 held by feed clamp 61. The indexing of the members 57, 58 is done in two stages so that the rotation of members 57 will not obstruct the line of travel of the feed clamp 61 to the right as viewed in the drawings. The first stage of indexing "I" is completed, in the preferred embodiment, after approximately one-quarter of the fed clamp 61 travel. The members dwell at position "I," see FIGURES 4 and 16, for 10°.

Prior to the limit of wire clamp 61 travel, the cutting and stripping unit 62 begins to close on the wire 31, as described in U.S. Patent No. 2,908,910. As the cutting unit 62 severs the wire 31, the indexing of members 57, 58 will bring the wire gripping units 59, 60 in position to receive the wire 31 (FIGURE 4). At this time, only the jaws 113, 114 of wire gripping unit 59 will grip the wire under the light spring pressure afforded by spring 118, as hereinabove described. The wire gripping unit 60 on member 58 will remain open until the subsequent stripping stroke of feed clamp 61 has been completed.

Upon completion of the stripping stroke for stripping the trailing end of wire 31, the wire gripping unit 60 will close jaws 113, 114 on wire 31 under heavy spring pressure from spring 110, as described hereinabove. The same spring pressure will grip at unit 59, and both ends of wire 31 are secured in the jaws of members 57, 58.

As soon as the wire 31 is securely clamped in the jaws of members 57, 58, the feed clamp 61 returns to pick up the next wire. As the feed clamp 61 closes to grip the next wire, the shaft 38 starts the first portion of its index at 310° (see FIGURE 16). When the feed clamp 61 has gripped the wire, it will be longitudinally displaced a distance to the left away from cutting and stripping unit 62 resulting in stripping of the leading end of the next wire to be brought to members 57, 58 for transfer to the terminal applying zone. This completes a cycle of the cutting and stripping machine 30.

For the application of terminals to the wires transferred to the terminal applying zone, the sequence is as follows:

As the wire is brought to the zone by the indexing of members 57, 58, the motion of the terminal applicator toward the wire begins at 105° in FIGURE 16. At 140°, the member 139 has positively engaged and located the members 57, 58 in relation to terminal attaching devices 40, 41. As the wire is about to be crimped, the forward motion of the terminal applicator 137 is complete. At that time (FIGURE 16), the wire 31 will be in a position directly above the terminals 47, 48, and will subsequently be located in the terminals without any distortion of the wire, as described hereinabove. After crimping, the member 139 will slidably move away from engagement with members 57, 58, and the members will further index as by rotation of shaft 38. This completes the terminal attaching sequence of the machine 30.

For clarity, FIGURES 17, 18, 19, and 20 illustrate the cutting and stripping unit 62 having the wire cutting knife 63 and insulation stripping knives 64 in relation to the wire feed clamp 61 and members 57, 58 at various degrees on the timing diagram of FIGURE 16. For example, at 325° in FIGURES 16 and 17, a wire 31 is held by members 57, 58, and the next wire is having its leading end stripped by the movement of clamp 61 relative to knives 63, 64. At 360° (FIGURE 18), the stripping of wire 31 is completed, and the conveyor with the previous wire is in the process of moving to the next zone. At 140° (FIGURE 19), the trailing end of wire 31 is being stripped as member 57 holds the wire 31 as hereinabove described. At 180° (FIGURE 20), the wire 31 is completed and carried to members 57, 58, and the leading end of the next wire is about to be stripped by knives 63, 64. FIGURE 21 shows a short length of wire 31a being gripped by a single member 58.

Thus, a wire cutting, stripping, and terminal applying apparatus has been described wherein a variety of wire lengths may be sequentially handled, and the terminals applied thereto without distortion of the wire. Further, the rotating members for carrying the wire from a cutting zone to a terminal applying zone, and finally to a discharge zone, are mechanically sequenced for indexing, wire gripping (both two stage and single stage), and terminal applying in relation to wire feed for producing various lengths of electrical conductors having terminals thereon. Also, one of the rotating members is removable to allow for the processing of short electrical conductors in said machine in substantially the same sequential manner.

Various modes of carrying out the invention are contemplated as being within the scope of the following claims particularly pointing out and distinctly claiming the subject matter which is regarded as the invention:

We claim:

1. In a wire severing and terminal attaching device, a main frame, a source of wire stock, a terminal attaching device mounted on said frame for receiving the ends of successive severed wire lengths, means for feeding successive terminals to said attaching device, reciprocable means for feeding wire stock longitudinally to a first zone laterally offset from said terminal attaching device, a rotatable member having a wire gripper provided with first and second wire clamping force means, means for severing said wire stock as it is held by said gripper in said first zone, means for stripping said wire stock while it is held by said gripper under said first force means, means for revolving said rotatable member in timed relation to said severing means to rotate said gripper while holding said wire stock under said second force means to arcuately advance the same to a second zone wherein ends of the successive wire lengths are received by said terminal attaching device, and means for actuating said terminal attaching device in timed relation to said wire advancing means for applying terminals to said successive wire lengths.

2. In a wire severing and terminal attaching device, a main frace, a source of wire stock, terminal attaching means mounted on said frame for receiving the ends of successive severed wire lengths, means for feeding successive terminals to said terminal attaching means, reciprocable means carried by the main frame for feeding wire stock longitudinally to a first zone spaced from said terminal attaching means, a rotatable means having an axis substantially parallel to longitudinal movement of said reciprocable means, said rotatable means having wire clamping means carried thereby for gripping said wire stock in said first zone, cam means for varying the gripping of said wire stock, means for severing said wire stock as it is gripped by said clamping means in said first zone, means for revolving said rotatable member in timed relation to said severing means to advance successive severed wire lengths to a second zone wherein ends of successive wire lengths are received by said terminal attaching means, and means for actuating said terminal attaching means in timed relation to said revolvable rotating member for applying terminals to said successive wire lengths.

3. The combination of claim 2 wherein said rotatable member includes a spider member having a plurality of radially extending arms, a wire gripping jaw carried at the outer end of each arm for gripping and releasing wire stock, and means for actuating said wire gripping jaws in timed relation to said severing means, reciprocable means, and said terminal attaching device.

4. The combination of claim 3 wherein said means for actuating said wire gripping jaws includes a power driven shaft carried by said main frame, cam means rotatable with said shaft, spider rods carried by each arm engageable with said cam to open and close said wire gripping jaws in timed relation with spider member rotation.

5. The combination of claim 4 wherein said spider rods are each provided with a spring means urging said wire gripping jaws to a closed position for gripping the wire stock, and wherein rotation of said cam means overcomes said spring to open said jaws.

6. The combination of claim 5 wherein each said spider rod is provided with a slot therein for engaging said wire gripping jaws, and a spring means acting on said jaws to close said jaws by urging said jaws against one end of said slot to hold wire stock in said jaws by said spring pressure.

7. The combination of claim 4 wherein each arm is provided with a spring means for closing said jaws, and a cam actuated means for opening said jaws against spring pressure.

8. In combination, a source of wire stock, a first and second terminal attaching device, said second terminal attaching device adjustably spaced from said first terminal attaching device, a reciprocable wire gripping clamp to fed wire stock longitudinally from said source past said first terminal attaching device, wire severing knives located between said source and said second terminal attaching device, a first spider member having a plurality of wire gripping means rotatable about a central axis by a power means for gripping one end of severed wire stock, a second spider member having a plurality of wire gripping means rotatable about said central axis by said power means and adjustably spaced longitudinally from said first spider member for gripping the other end of said severed wire stock, and cam means for said first spider members for actuating the wire gripping means at a predetermined sequence of gripping forces.

9. In a wire severing and terminal attaching machine having a main frame and a power means, the combination of a source of wire stock for said machine, a first terminal attaching device mounted on said frame for receiving one end of severed wire stock, a second terminal attaching device mounted for longitudinal movement along said frame for receiving the other end of said severed wire stock, means for feeding wire stock longitudinally of said main frame to a location between said first and second terminal attaching device, wire severing means located between said source and said second terminal attaching device and operable to allow said wire gripping device to pass therethrough, a pair of axially spaced rotatable members for gripping said wire stock in a first zone for wire severance thereof, means for varying the gripping action of one of said rotatable members, said rotatable members arcuately advancing said severed wire stock to a second zone for terminal attachment at each end of said severed wire stock at said first and second terminal attaching device, and actuating means for discharging said severed wire stock with terminals thereon from said pair of rotatable members.

10. The combination of claim 9 wherein each of said rotatable members is provided with a plurality of radially extending arms, said arms being provided with means for opening and closing wire gripping fingers located at the ends of said arm, and cam means for actuating said wire gripping means in timed relation with said wire gripping clamp reciprocation and terminal application at said first and second terminal attaching devices.

11. The device of claim 1 wherein the first and second wire clamping force means are springs having different magnitudes.

12. The device of claim 1 wherein the first and second wire clamping means include a first spring and a second spring, said first spring having a lesser magnitude than the second spring for providing two different wire clamping forces.

13. The device of claim 1 wherein said terminal attaching device receives said wire stock being gripped in said rotatable member immediately above terminals to be applied thereto by said terminal attaching device, said terminal attaching device including means for positioning said wire stock in said terminals prior to crimping without distortion of said wire stock.

14. In the machine of claim 9 wherein said first and second terminal attaching devices include means operable in said second zone for positioning said severed wire stock into the terminals in the terminal applying zone without distorting said wire stock prior to terminal attachment by said terminal attaching devices.

15. The device of claim 2 wherein said means for actuating said terminal attaching means includes a means for locating said severed wire lengths in said terminals without distortion or bending of said severed wire lengths prior to or during terminal attachment.

References Cited by the Examiner

UNITED STATES PATENTS

| | | | |
|---|---|---|---|
| 2,688,133 | 9/1954 | Berg | 29—33 X |
| 2,768,425 | 10/1956 | Andren | 29—33 X |
| 3,019,679 | 2/1962 | Schwalm | 29—33 X |
| 3,029,494 | 4/1962 | Andren | 29—33 X |

RICHARD H. EANES, JR., *Primary Examiner.*